United States Patent
Koifman (10) Patent No.: US 7,145,956 B2
(45) Date of Patent: Dec. 5, 2006

(54) METHOD FOR ACHIEVING A TARGET BIT RATE IN A MULTI-CARRIER DATA COMMUNICATION SYSTEM

(75) Inventor: Gil Koifman, Petah Tikva (IL)

(73) Assignee: Smart Link Ltd., Netanya (IL)

( * ) Notice: Subject to any disclaimer, the term of this patent is extended or adjusted under 35 U.S.C. 154(b) by 815 days.

(21) Appl. No.: 10/180,512

(22) Filed: Jun. 27, 2002

(65) Prior Publication Data
US 2004/0001552 A1    Jan. 1, 2004

(51) Int. Cl.
*H04K 1/10* (2006.01)
(52) U.S. Cl. .................. 375/260; 370/484; 455/59
(58) Field of Classification Search ............... 375/260, 375/295, 264, 130, 220; 370/210, 252, 468
See application file for complete search history.

(56) References Cited

U.S. PATENT DOCUMENTS

| | | | | |
|---|---|---|---|---|
| 4,438,511 A | * | 3/1984 | Baran | 370/204 |
| 5,400,322 A | * | 3/1995 | Hunt et al. | 370/468 |
| 5,479,447 A | * | 12/1995 | Chow et al. | 375/260 |
| 5,521,906 A | * | 5/1996 | Grube et al. | 370/252 |
| 5,790,550 A | * | 8/1998 | Peeters et al. | 370/480 |
| 5,852,633 A | * | 12/1998 | Levin et al. | 375/130 |
| 5,991,269 A | * | 11/1999 | Williamson et al. | 370/241 |
| 6,005,893 A | * | 12/1999 | Hyll | 375/260 |
| 6,075,821 A | * | 6/2000 | Kao et al. | 375/260 |
| 2001/0031016 A1 | | 10/2001 | Seagraves | |

OTHER PUBLICATIONS

Optimum Bit Allocation Algorithm for DMT-based Systems under Minimum Power Constraint, Kourtis, S., Dec. 1999, IEE Journal, vol. 35, Issue 25, pp. 2181-2182.*
An Efficient Bit-Loading Algorithm for DMT Applications, Ranjan V. Solankar and Richard R. Shively, Nov. 1998, Globecom 98, vol. 5, pp. 2683-2688.*

* cited by examiner

*Primary Examiner*—Jay K. Patel
*Assistant Examiner*—Adolf DSouza
(74) *Attorney, Agent, or Firm*—Hoffman, Wasson & Gitler, PC (57) ABSTRACT

A bit loading for a channel of a multi-carrier data communication system is generated. The bit loading has a target bit rate and satisfies predetermined performance criteria. When the channel is loaded according to the bit loading, a minimal number of sub-channels of the channel are active.

11 Claims, 5 Drawing Sheets

METHOD FOR ACHIEVING A TARGET BIT RATE IN A MULTI-CARRIER DATA COMMUNICATION SYSTEM

BACKGROUND OF THE INVENTION

Multi-carrier data communication systems transmit data by splitting it into several components and sending each of these components over separate carrier signals. The communication channel, which generally has broad bandwidth, is divided into sub-channels that generally have narrow bandwidth. The individual carrier is generally at the center of the sub-channel. In Asymmetric Digital Subscriber Line (ADSL) systems, for example, the number of sub-channels is typically 128 or 256.

When data is to be sent over the communication channel, it is split into several groups of small numbers of bits, with each of the groups of bits being modulated onto the carrier of a sub-channel and transmitted in parallel. The allocation of the data bits among the sub-channels is known collectively as the "bit loading" of the channel, while the assignment of the relative gains applied to the transmitted symbols of the sub-channels is known as the "energy loading". The bit loading and energy loading are calculated according to a bit-loading algorithm, several of which are known in the art. The bits are generally not allocated evenly among all the sub-channels. Those sub-channels having one or more bits allocated to them are called "active" sub-channels.

Given a particular bit loading, the total bit rate for the channel is the product of the baud rate (composite symbols per second) and the total number of allocated bits. The maximum number of bits that any particular sub-channel can have allocated thereto may depend on a number of factors, such as sub-channel conditions (for example, the signal-to-noise ratio of the sub-channel), system configuration options and specified system performance goals. The maximum achievable total bit rate is then the product of the baud rate and the sum of the maximum number of bits that each sub-channel can carry.

There are several reasons that the target bit rate may be lower than the maximum achievable total bit rate. In a non-limiting example, in ADSL, the central office may limit the total bit rate to a much lower rate than could be achieved. In another non-limiting example, the total bit rate may be reduced in order to maintain a total power constraint. In a further non-limiting example, the total bit rate may be temporarily reduced during periods of little or no activity at the communication layers or the application layer above the physical layer.

In some multi-carrier data communication systems, the processing power available to modulate and/or demodulate data may be limited.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

It should be understood that the present invention may be used in a variety of applications. Although the present invention is not limited in this respect, the methods disclosed herein may be used in many apparatuses such as in the transmitters and receivers (or transceivers) of a multi-carrier data communication system. The transmitters may use the invention when modulating data to be transmitted in the multi-carrier data communication system. The receivers may use the invention when demodulating data received in the multi-carrier data communication system. Although the present invention is not limited in this respect, the transceivers may be modems, for example, soft modems or modems embedded on a digital signal processor (DSP).

Multi-carrier data communication systems intended to be included within the scope of the present invention include, by way of example only, discrete multi-tone (DMT) systems, orthogonal frequency division multiplexing (OFDM) systems, and the like. Types of discrete multi-tone systems intended to be within the scope of the present invention include, although are not limited to, Asymmetric Digital Subscriber Line (ADSL) systems. Standards for some multi-carrier data communication systems are provided as recommendations from the Telecommunications Standards Section of the International Telecommunication Union (designated as ITU-T). For example, G.992.1 and G.992.2 are two of the recommendations that refer to ADSL transceivers.

In some multi-carrier transceivers, the processing power available to modulate and/or demodulate data may be limited. For example, in a soft modem, the host processor, generally a central processing unit (CPU), uses its processing power for a variety of tasks in addition to the modulation and/or demodulation of data. In the example of an embedded modem on a DSP, the DSP has limited processing power and may be used for a variety of tasks in addition to the modulation and/or demodulation of data.

In some cases, the processing power used to modulate and/or demodulate data in an multi-carrier transceiver may be correlated to the number of active sub-channels. This may be due, for example, to the particular algorithm at the physical layer, although it may be due to other factors instead or additionally. Although the present invention is not limited in this respect, examples of physical layer algorithms that may result in a correlation between the number of active sub-channels and the processing power used to modulate and/or demodulate data include frequency-domain equalization (FEQ), a constellation encoder/decoder which may be, for example, a trellis encoder/decoder, and the like.

The following description makes reference to an exemplary bit loading for purposes of illustration of various embodiments of the present invention. The exemplary bit loading is shown in Table 1. In this example, the bandwidth is divided into eight sub-channels. The first column of Table 1 lists the index i of the sub-channel. The second column lists the bandwidth of sub-channel i in kiloHertz (kHz). The third column lists the number of bits $b_i$ allocated to the sub-channel i in the bit loading. In this particular example, seven of the eight sub-channels are active ($b_i \neq 0$) and the total number of allocated bits for the bit loading of Table 1 is 45 bits.

TABLE 1

| Index i of sub-channel | Bandwidth of sub-channel i (kHz) | No. of bits ($b_i$) allocated to sub-channel i |
|---|---|---|
| 0 | 0–138 | 1 |
| 1 | 139–276 | 2 |
| 2 | 277–414 | 5 |
| 3 | 415–552 | 15 |
| 4 | 553–690 | 10 |
| 5 | 691–828 | 8 |
| 6 | 829–966 | 4 |
| 7 | 967–1104 | 0 |
| TOTAL | 1.104 MHz | 45 |

A target bit rate may be less than the bit rate of the bit loading. For example, in the present example, the total number of allocated bits is 45, and the target bit rate may be such that the total number of allocated bits should be 30 bits.

Some embodiments of the present invention are directed to methods for generating a bit loading for a channel of a multi-carrier data communication system. The bit loading has a target bit rate and satisfies predetermined performance criteria. When the channel is loaded according to the bit loading generated according to some embodiments of the present invention, a minimal number of sub-channels of the channel are active.

In one embodiment of the present invention, the bit loading may be generated by deallocating bits from any preliminary bit loading that satisfies predetermined performance criteria and whose bit rate is higher than the target bit rate. This embodiment of the present invention is described in more detail with respect to FIG. 1. In another embodiment of the present invention, the bit loading may be generated by allocating bits to a new bit loading from any preliminary bit loading that satisfies predetermined performance criteria and whose bit rate is higher than the target bit rate. This embodiment of the present invention is described in more detail with respect to FIG. 2. In another embodiment of the present invention, the bit loading may be generated by determining how many bits to allocate to each of the sub-channels in order to achieve a desired bit error rate or alternatively to achieve a desired bit error rate with a desired noise margin, and then allocating bits to the bit loading one sub-channel at a time according to the number of bits in decreasing order until the target bit rate is achieved. This embodiment of the present invention is described in more detail with respect to FIG. 3.

Some embodiments of the present invention are directed to multi-carrier transceivers. Although the scope of the present invention is not limited in this respect, the multi-carrier transceiver may be a modem embedded in a digital signal processor, for example, or may be a soft modem. These embodiments are described in more detail with respect to FIGS. 4, 5A and 5B. Some embodiments of the present invention are directed to a multi-carrier data communication system.

Figure 1:
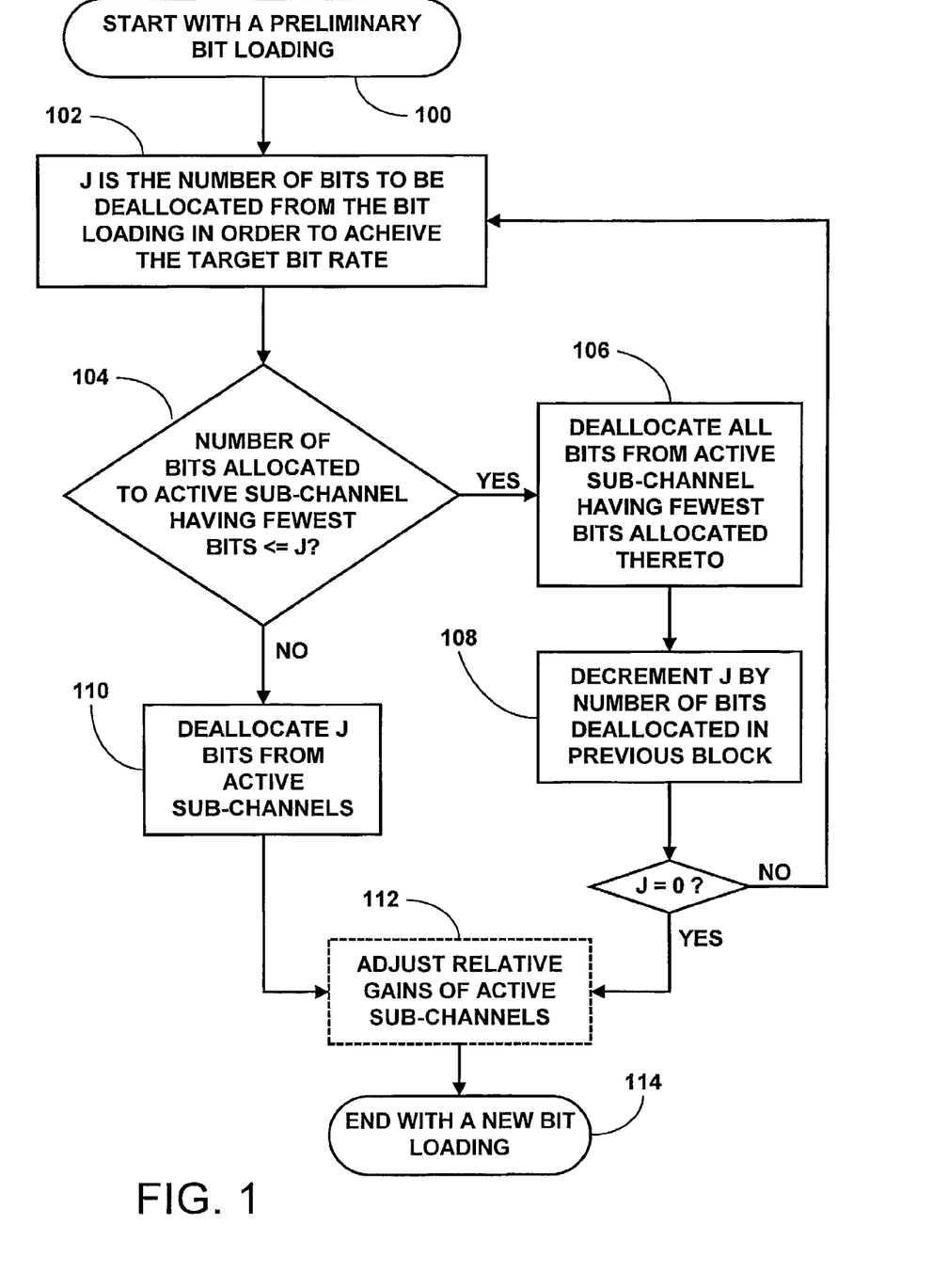
FIG. 1 is a flowchart illustration of a method for achieving a target bit rate by deallocating bits from a preliminary bit loading so as to reduce as many active sub-channels as possible, according to an embodiment of the present invention.

Reference is now made to FIG. 1, which is a flowchart illustration of a method for achieving a target bit rate by deallocating bits from any preliminary bit loading satisfying predetermined performance criteria so as to reduce as many active sub-channels as possible, according to an embodiment of the present invention. The method starts with a preliminary bit loading satisfying predetermined performance criteria (block 100). J is the number of bits to be deallocated from the bit loading (block 102). In the present example, J is 15. The active sub-channel having the fewest bits is identified, and it is tested whether the number of bits allocated thereto is less than or equal to J (block 104).

If the number of bits allocated to the active sub-channel having the fewest bits is less than or equal to J, then all the bits of that sub-channel are deallocated (block 106), and the number J is decremented by the number of deallocated bits (block 108). If more bits are to be deallocated (J is not equal to 0), then the method resumes from block 102. If no more bits are to be deallocated (J is equal to 0), then the method continues to block 112, which is described hereinbelow.

If the number of bits allocated to the active sub-channel having the fewest bits is greater than J, then J bits are deallocated from the remaining active sub-channels (block 110). This deallocation of the bits in the remaining active sub-channels may be done according to various criteria such as, but not limited to, sub-channel conditions, system configuration options and specified system performance goals. Although the present invention is not limited in this respect, examples of such criteria may include any or a combination of the following: achieving a given target bit error rate (BER) (or a target BER and margin); maintaining a total power constraint; maintaining a power spectral density (PSD) constraint; minimizing the BER at a given bit rate; minimizing the total power at a given target bit rate. The method then continues to block 112.

Although the present invention is not limited in this respect, the relative gains of the active sub-channels which have remained active after the deallocation may be adjusted in block 112 in order to incorporate various system configuration options or specified system performance goals into the bit and energy loading. The method ends with a completed new bit loading having the target bit rate (block 114).

Table 2 shows the progression of the bit loading as the method of FIG. 1 is implemented on the bit loading of Table 1. The arrows show the deallocation of bits.

TABLE 2

| Index of sub-channel i | Bandwidth of sub-channel i (kHz) | No of bits ($b_i$) | | | | | |
|---|---|---|---|---|---|---|---|
| 0 | 0–138    | 1 → 0 | 0 | 0 | 0 | 0 | |
| 1 | 139–276  | 2 | 2 → 0 | 0 | 0 | 0 | |
| 2 | 277–414  | 5 | 5 | 5 | 5 → 0 | 0 | |
| 3 | 415–552  | 15 | 15 | 15 | 15 | 15 → | 13 |
| 4 | 553–690  | 10 | 10 | 10 | 10 | 10 → | 9 |
| 5 | 691–828  | 8 | 8 | 8 | 8 | 8 | 8 |
| 6 | 829–966  | 4 | 4 | 4 → 0 | 0 | 0 | |
| 7 | 967–1104 | 0 | 0 | 0 | 0 | 0 | |
| TOTAL | 1.104 MHz | 45 | 44 | 42 | 38 | 33 | 30 |

It will be appreciated that various modifications of the method presented in FIG. 1 may occur to persons of ordinary skill in the art. These modifications are intended to be within the scope of the present invention. For example, block 106 may be modified to deallocate one bit from the active sub-channel having the fewest allocated bits, and block 108 may be modified to decrement J by 1.

It will also be appreciated by persons of ordinary skill in the art that by deallocating bits from the bit loading in the manner described hereinabove, the number of active sub-channels may be reduced as much as possible while achieving the target bit rate. Moreover, the new bit loading thus achieved need not have a worse bit error rate than that of the preliminary bit loading and need not exceed the power spectral density and total power constraints.

Figure 2:
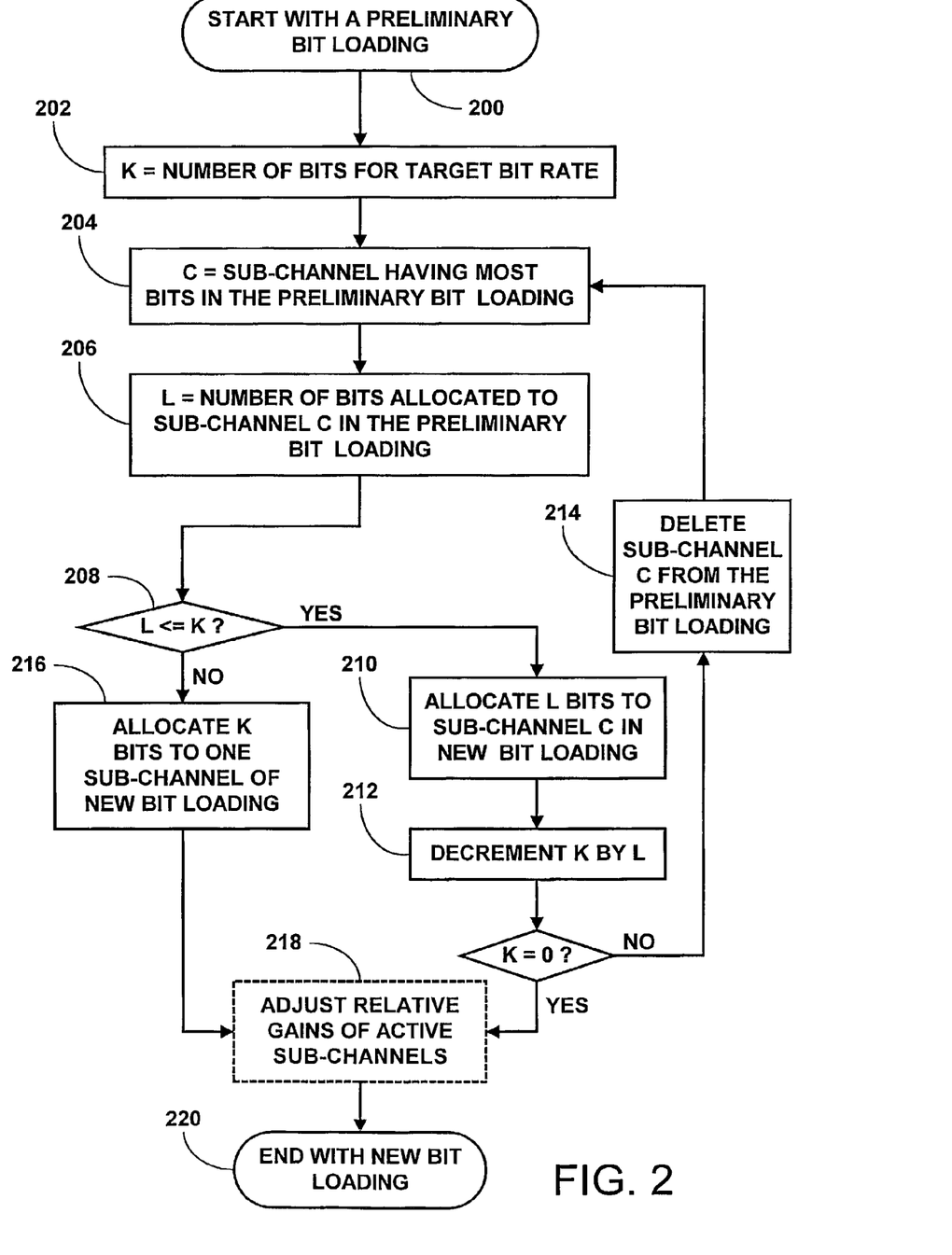
FIG. 2 is a flowchart illustration of a method for achieving a target bit rate by allocating bits from a preliminary bit loading to a new bit loading so as to have a minimal number of active sub-channels in the new bit loading, according to another embodiment of the present invention.

Reference is now made to FIG. 2, which is a flowchart illustration of a method for achieving a target bit rate by allocating bits from any preliminary bit loading satisfying predetermined performance criteria to a new bit loading so as to have a minimal number of active sub-channels in the new bit loading, according to another embodiment of the present invention. The method starts with a preliminary bit loading satisfying predetermined performance criteria (block 200). K is the number of bits to be allocated to the new bit loading (block 202), related to the target bit rate. In the present example, K is 30. The active sub-channel of the preliminary bit loading having the most bits (sub-channel C) is identified (block 204). L is the number of bits allocated to sub-channel C in the preliminary bit loading (block 206). It is tested whether L is less than or equal to K (block 208).

If L is less than or equal to K, then all the bits of that sub-channel (L bits) are allocated to the same sub-channel C in the new bit loading (block 210), and the number K is decremented by L (block 212). If more bits are to be allocated to the new bit loading (K is not equal to 0), then sub-channel C is deleted from the preliminary bit loading B (block 214), and the method resumes from block 204. If no more bits are to be allocated to the new bit loading (K is equal to 0), then the method continues to block 218, which is described hereinbelow.

If L is greater than K, then K bits are allocated to one sub-channel in the new bit loading (block 216). The sub-channel of the new bit loading to which the K bits are allocated is not, prior to block 216, an active sub-channel of the new bit loading. Moreover, it may be selected from among the inactive sub-channels of the new bit loading according to various criteria such as, but not limited to, sub-channel conditions, system configuration options and specified system performance goals. Although the present invention is not limited in this respect, examples of such criteria may include any or a combination of the following: achieving a given target BER (or a target BER and margin); maintaining a total power constraint; maintaining a PSD constraint; minimizing the BER at a given bit rate; minimizing the total power at a given target bit rate. The method then continues to block 218.

Although the present invention is not limited in this respect, the relative gains of the active sub-channels of the new bit loading may be adjusted in block 218 in order to incorporate various system configuration options or specified system performance goals into the bit and energy loading. The method ends with a completed new bit loading having the target bit rate (block 220).

Table 3 shows the progression of the bit loading as the method of FIG. 2 is implemented on the bit loading of Table 1. The arrows show the allocation of bits in the new bit loading.

TABLE 3

| Index of sub-channel i | Bandwidth of sub-channel i (kHz) | No. of bits ($b_i$) | | | | | |
|---|---|---|---|---|---|---|---|
| 0 | 0–138    | 1 | | | | | 0 |
| 1 | 139–276  | 2 | | | | | 0 |
| 2 | 277–414  | 5 | | | | | 0 |
| 3 | 415–552  | 15 → | 15 | 15 | | 15 → | 13 |
| 4 | 553–690  | 10 | | → 10 | 10 → | 9 | |
| 5 | 691–828  | 8 | | | → 5 → | 8 | |
| 6 | 829–966  | 4 | | | | | 0 |
| 7 | 967–1104 | 0 | | | | | 0 |
| TOTAL | 1.104 MHz | 45 | 15 | 25 | 30 | 30 | |

It will be appreciated that various modifications of the method presented in FIG. 2 may occur to persons of ordinary skill in the art. These modifications are intended to be within the scope of the present invention. For example, block 206 may be modified to allocate one bit from the active sub-channel of the preliminary bit loading having the most bits, and block 208 may be modified to decrement K by 1.

It will also be appreciated by persons of ordinary skill in the art that by allocating bits from the preliminary bit loading to the new bit loading in the manner described hereinabove, the number of active sub-channels may be minimized while achieving the target bit rate. Moreover, the new bit loading need not have a worse bit error rate than that of the preliminary bit loading and need not exceed the power spectral density and total power constraints.

Figure 3:
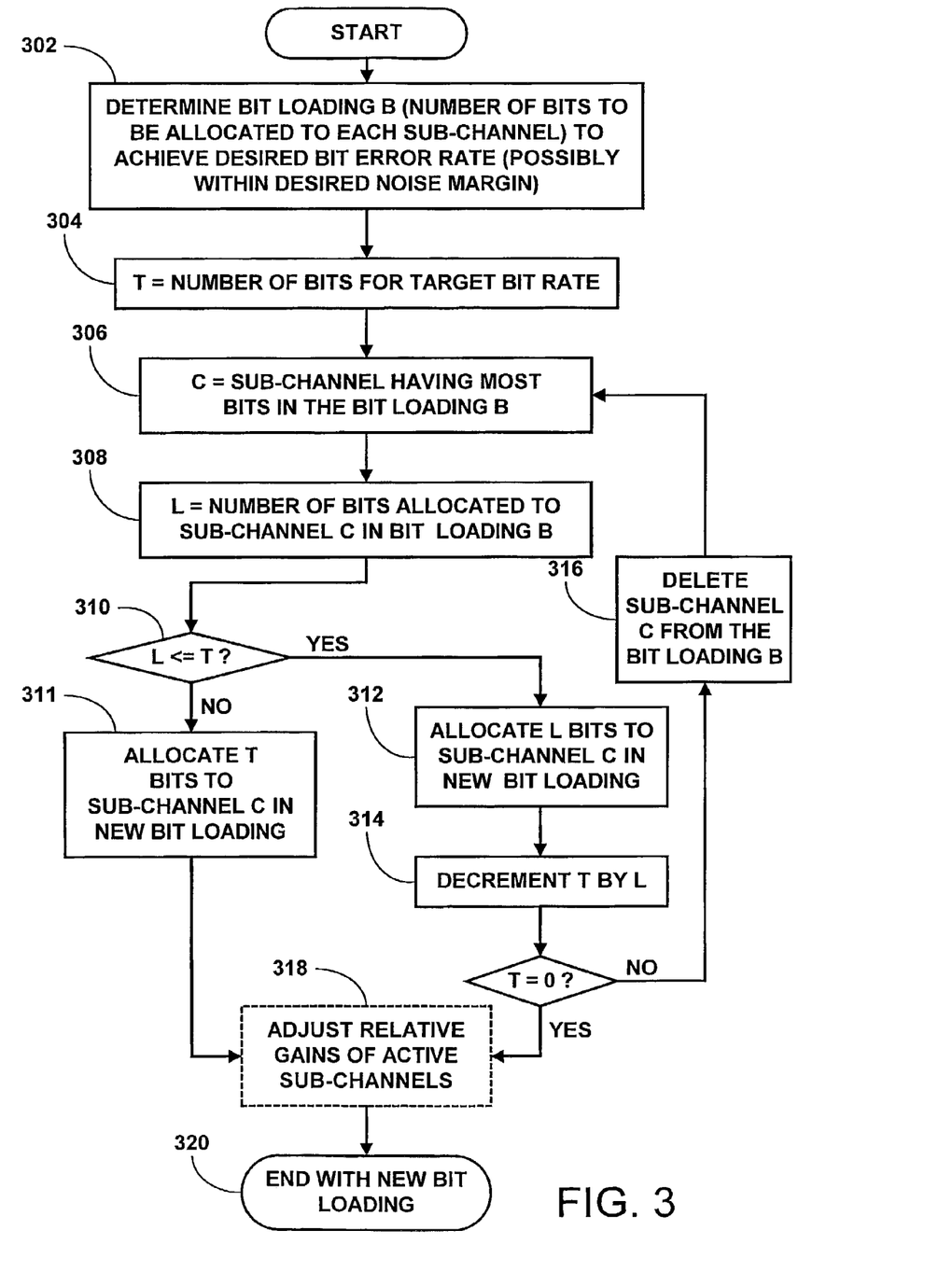
FIG. 3 is a flowchart illustration of a method for generating a bit loading having a target bit rate and a minimal number of active sub-channels, according to a further embodiment of the present invention.

Reference is now made to FIG. 3, which is a flowchart illustration of a method for generating a new bit loading having a target bit rate and a minimal number of active sub-channels, according to a further embodiment of the present invention. A bit loading B is determined that defines how many bits are to be allocated to each sub-channel in order to achieve a desired bit error rate or a desired bit error rate with a desired noise margin (block 302), taking into account sub-channel conditions and system configuration options. T is the number of bits to be allocated to the new bit loading (block 304), related to the target bit rate. The total number of bits determined in block 302 may be higher than needed to achieve the target bit rate. If so, then the new bit loading will be generated as follows. The sub-channel C that according to block 302 should have the most bits is identified (block 306). L is the number of bits allocated to sub-channel C in bit loading B (block 308). If L is less than or equal to T (block 310), then L bits are allocated to the same sub-channel C in the new bit loading (block 312), and the number T is decremented by L (block 314). If more bits are to be allocated to the new bit loading (T is not equal to 0), then sub-channel C is deleted from bit loading B (block 316), and the method resumes from block 306, where now the sub-channel that according to block 302 should have the second highest number of bits is identified. The loop created by blocks 306-316 is repeated as many times as needed, one sub-channel at a time according to the number of bits determined for the sub-channel in block 302 in decreasing order. If no more bits are to be allocated (T is equal to 0), then the method continues to block 318, which is described hereinbelow.

If L is greater than T (block 310), then T bits are allocated to the same sub-channel C in the new bit loading (block 311). The method then continues to block 318.

Although the present invention is not limited in this respect, the relative gains of the active sub-channels of the new bit loading may be adjusted in block 318 in order to incorporate various system configuration options or specified system performance goals into the bit and energy loading. The method ends with a new bit loading having the target bit rate (block 320).

It will be appreciated that various modifications of the method presented in FIG. 3 may occur to persons of ordinary skill in the art. These modifications are intended to be within the scope of the present invention.

It will also be appreciated by persons of ordinary skill in the art that by allocating bits to the new bit loading in the manner described hereinabove, the number of active sub-channels may be minimized while achieving the target bit rate. Moreover, if a desired bit error rate is used in block 302, the new bit loading need not have a worse bit error rate than the desired bit error rate.

Figure 4:
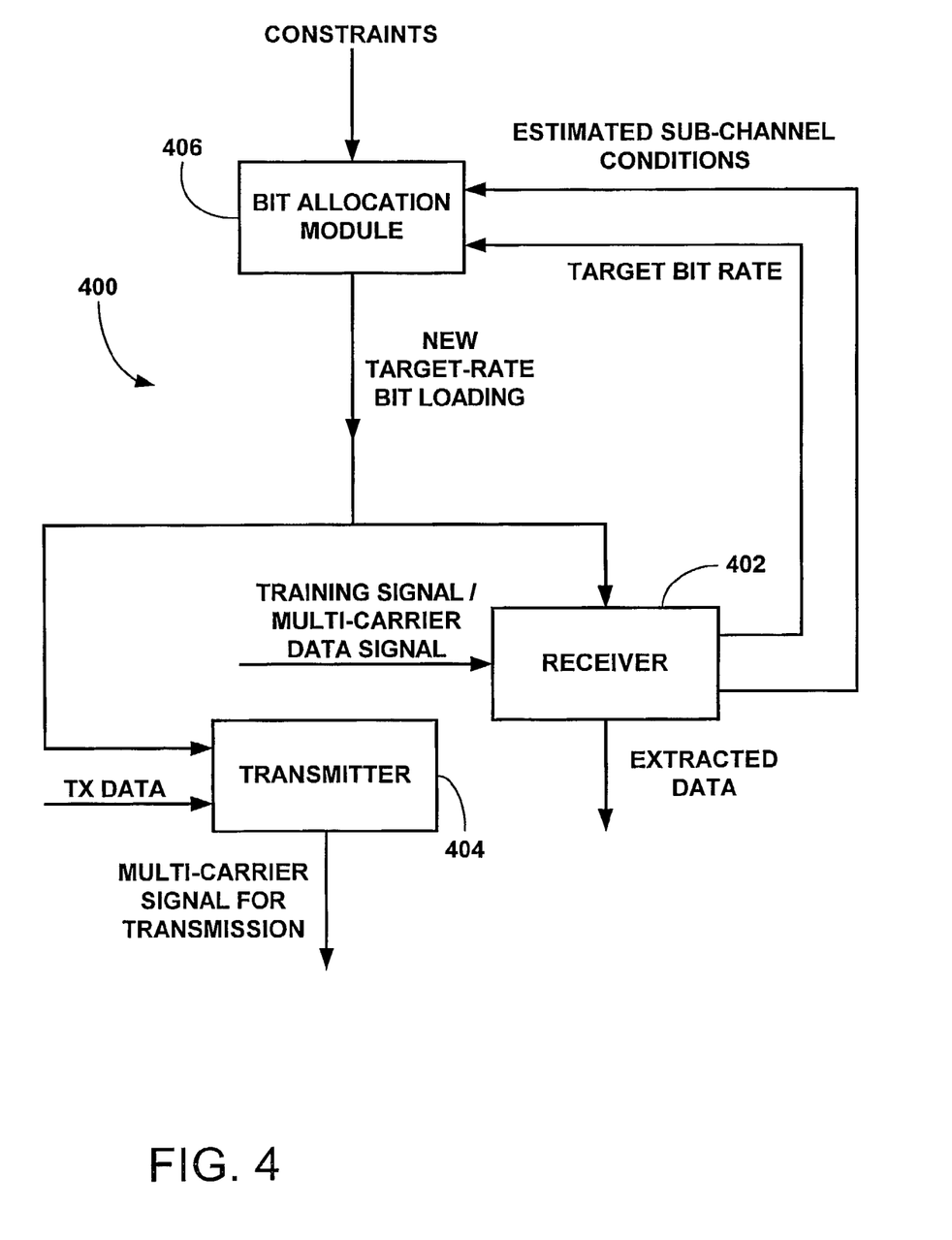
FIG. 4 is a simplified block-diagram illustration of a multi-carrier transceiver according to an embodiment of the present invention.

Reference is now made to FIG. 4, which is a simplified block-diagram illustration of a multi-carrier transceiver, generally referenced 400, according to an embodiment of the present invention. Transceiver 400 may comprise a receiver 402, a transmitter 404, and a bit allocation module 406. Although bit allocation module 406 is shown in FIG. 4 as a separate module, it may be incorporated into receiver 402 or transmitter 404 or a part of transceiver 400 shared by receiver 402 and transmitter 404. Well-known components and circuits of transceivers have not been shown in FIG. 4 so as not to obscure the description of the present invention.

During training, receiver 402 may receive a training sequence from another multi-carrier transceiver (not shown). Receiver 402 may process the training sequence and produce therefrom estimates of sub-channel conditions such as, but not limited to, signal-to-noise (SNR) ratios. Receiver 402 may receive a target bit rate from the other multi-carrier transceiver, or alternatively, receiver 402 may calculate a target bit rate based upon the estimates of the sub-channel conditions and/or upon system configuration options.

Bit allocation module 406 may use the estimated sub-channel conditions and the target bit rate to generate a new bit loading having the target bit rate and subject to various constraints, such as, but not limited to, system configuration options or specified system performance goals. The new bit loading is such that a minimal number of sub-channels are active when the channel is loaded with the new bit loading. Bit allocation module 406 may, for example, implement the method of FIG. 1, FIG. 2 or FIG. 3, or any other suitable method, to generate the target-rate bit loading.

The target-rate bit loading may be sent to transmitter 404 for transmission to the other multi-carrier transceiver. Then a data session between transceiver 400 and the other multi-carrier transceiver may begin, with the other multi-carrier transceiver sending a multi-carrier modulated signal to transceiver 400, which is received by receiver 402. Receiver 402 may demodulate the received multi-carrier data signal according to the target-rate bit loading to extract the data contained therein.

At some point during the data session, receiver 402 may receive an indication from the other multi-carrier transceiver to reduce the bit rate to a new target bit rate that is lower than the bit rate of the current bit loading. Alternatively, receiver 402 itself may decide to reduce the bit rate to a new target bit rate that is lower than the bit rate of the current bit loading, due to channel conditions and/or predetermined performance criteria. Bit allocation module 406 may generate a new bit loading having the new target bit rate, such that a minimal number of sub-channels are active when the channel is loaded with the new bit loading. This new-target-rate bit loading may be sent by transmitter 404 to the other multi-carrier transceiver. Then the data session may continue, with modulation and/or demodulation of the data being performed according to the new-target-rate bit loading.

Figure 5A:
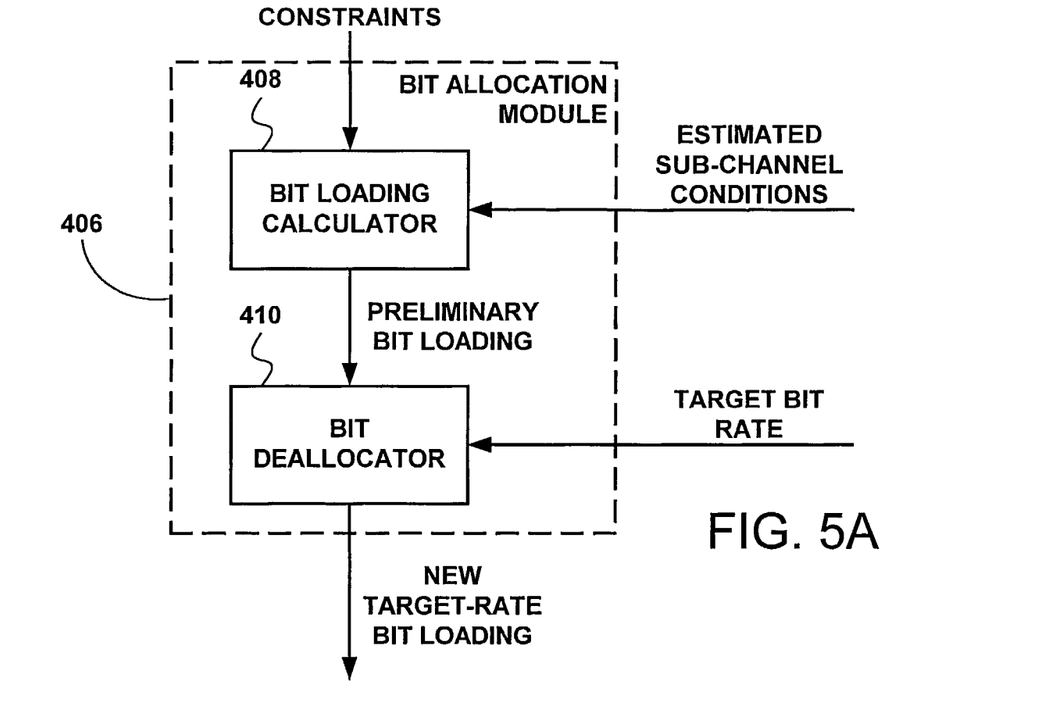
FIGS. 5A and 5B are simplified block-diagram illustrations of bit allocation modules, according to some embodiments of the present invention.
Figure 5B:
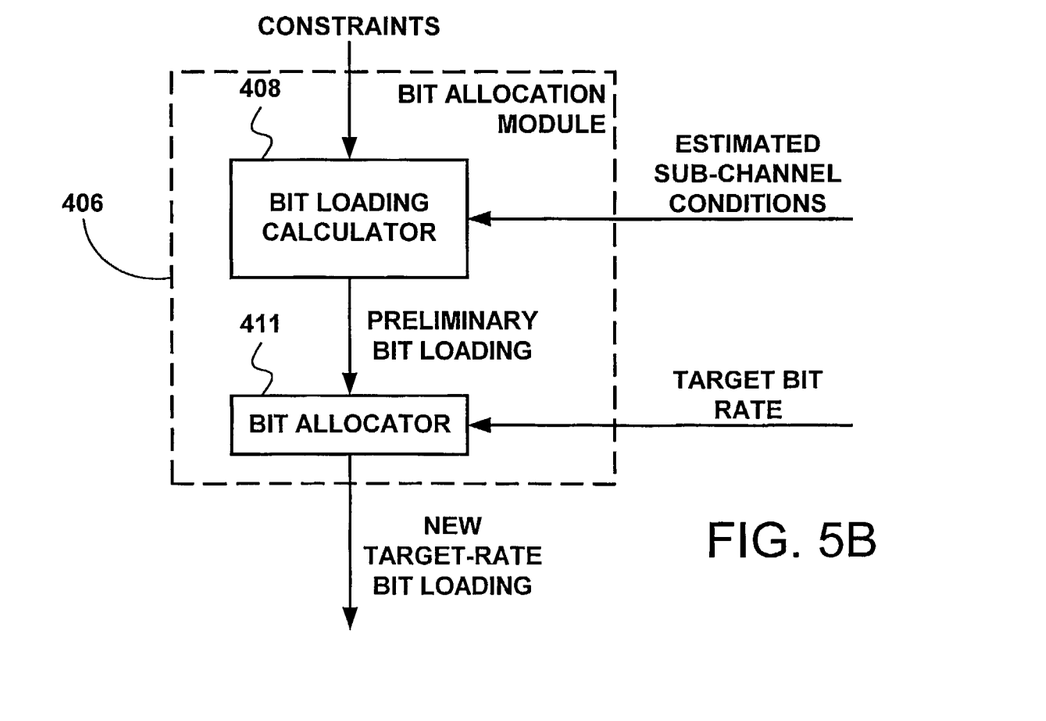

Reference is now made additionally to FIGS. 5A and 5B, which are simplified block-diagram illustrations of bit allocation modules, according to some embodiments of the present invention. Bit allocation module 406 may comprise a bit loading calculator 408 and a bit deallocator 410, as shown in FIG. 5A. Alternatively, bit allocation module 406 may comprise bit loading calculator 408 and a bit allocator 411, as shown in FIG. 5B.

Bit loading calculator 408 may use the estimated sub-channel conditions to calculate a preliminary bit loading according to the input and subject to various constraints such as, but not limited to, system configuration options or specified system performance goals. The preliminary bit loading produced by bit loading calculator 408 may represent a maximum achievable bit loading considering the system configuration options and/or specified system performance goals taken into account by the bit-loading algorithm of bit loading calculator 408 and considering the current sub-channel conditions, such as, but not limited to, signal-to-noise ratios.

The preliminary bit loading calculated by bit loading calculator 408 may have a bit rate higher than the target bit rate. If bit allocation module 406 comprises bit allocator 411, as shown in FIG. 5B, bit allocator 411 may allocate bits from the preliminary bit loading to a new bit loading having the target bit rate. For example, bit allocator 411 may implement the method shown in FIG. 2.

Alternatively, if bit allocation module 406 comprises bit deallocator 410, as shown in FIG. 5A, bit deallocator 410 may deallocate bits from the preliminary bit loading in order to achieve the target bit rate while reducing as many active sub-channels as possible, thus producing a target-rate bit loading. For example, bit deallocator 410 may implement the method shown in FIG. 1. Moreover, in the case of receiver 402 receiving an indication to reduce the bit rate to a new target bit rate that is lower than the bit rate of the current bit loading, bit deallocator 410 may deallocate bits from the current bit loading in order to achieve the new target bit rate. When deallocating bits, bit deallocator 410 will reduce as many active sub-channels as possible.

One or more of the functions shown in FIGS. 4, 5A and 5B may be implemented by a DSP. Additionally, one or more of the functions shown in FIGS. 4, 5A and 5B may be implemented in software, hardware, firmware or any combination thereof. Although the components of transceiver 400 shown in FIG. 4 are depicted as individual units, any combination of these components and any other components of transceiver 400 that are not shown in FIG. 4 may also be implemented in a single discrete unit, for example a single DSP chip or chip set.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
    determining an initial bit loading for a set of sub-channels of a channel in a multi-carrier data communication system, the initial bit loading defining an initial total bit rate that is achievable subject to predetermined performance criteria;
    setting a target bit rate that is lower than the initial total bit rate; and
    determining a new bit loading that is sufficient to achieve the target bit rate by selecting a subset of the sub-carriers to be used in communication over the channel, such that the subset comprises a minimal number of the sub-channels that is needed to achieve the target bit rate subject to the predetermined performance criteria.

2. The method of claim 1, wherein the initial bit loading defines respective bit allocations of the sub-channels, and wherein selecting the subset comprises selecting for inclusion in the subset one or more of the sub-carriers for which the respective bit allocations are greatest among the sub-carriers in the set.

3. The method of claim 1, wherein the initial bit loading defines respective bit allocations of the sub-channels, and wherein selecting the subset comprises deactivating one or more of the sub-carriers for which the respective bit allocations are smallest among the sub-carriers in the set.

4. The method according to claim 1, wherein the performance criteria comprise at least one of a bit error rate and a noise margin.

5. Communication apparatus, comprising:
    a multi-carrier transceiver for communicating data over a channel in a multi-carrier data communication system at a target bit rate; and
    a bit allocation module, which is operative to determine an initial bit loading for a set of sub-channels of the channel, the initial bit loading defining an initial total bit rate that is achievable by the transceiver subject to predetermined performance criteria, and which is further operative, when the target bit rate is lower than the initial total bit rate, to determine a new bit loading for the transceiver that is sufficient to achieve the target bit rate by selecting a subset of the sub-carriers to be used in communication over the channel, such that the subset comprises a minimal number of the sub-channels that is needed to achieve the target bit rate subject to the predetermined performance criteria.

6. The apparatus of claim 5, wherein the initial bit loading defines respective bit allocations of the sub-channels, and wherein the bit allocation module is adapted to select for inclusion in the subset one or more of the sub-carriers for which the respective bit allocations are greatest among the sub-carriers in the set.

7. The apparatus of claim 5, wherein the initial bit loading defines respective bit allocations of the sub-channels, and wherein the bit allocation module is adapted to deactivate one or more of the sub-carriers for which the respective bit allocations are smallest among the sub-carriers in the set.

8. The apparatus according to claim 5, wherein the performance criteria comprise at least one of a bit error rate and a noise margin.

9. The apparatus according to claim 5, wherein the multi-carrier transceiver comprises a soft modem.

10. The apparatus according to claim 9, wherein the soft modem is adapted for Asymmetric Digital Subscriber Line (ADSL) operation.

11. The apparatus according to claim 5, wherein the transceiver is operative to modulate and transmit the data over the channel using the new bit loading, and comprising a receiver, which is coupled to receive and demodulate the data transmitted over the channel.

* * * * *